UNITED STATES PATENT OFFICE.

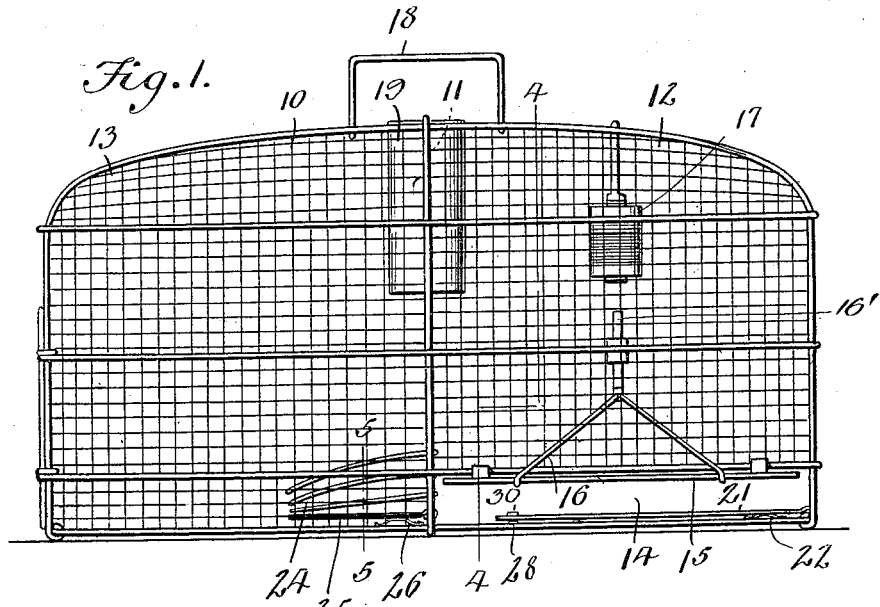
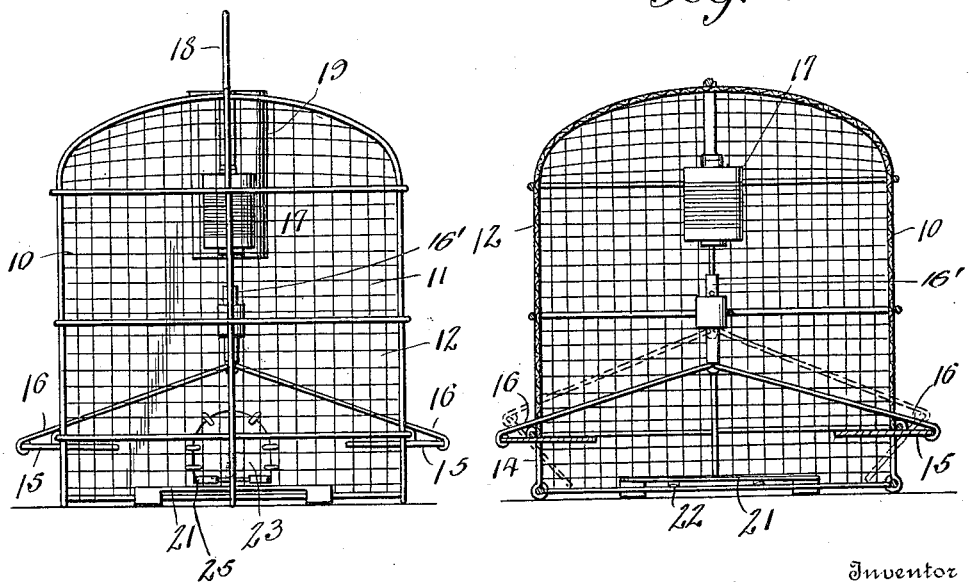

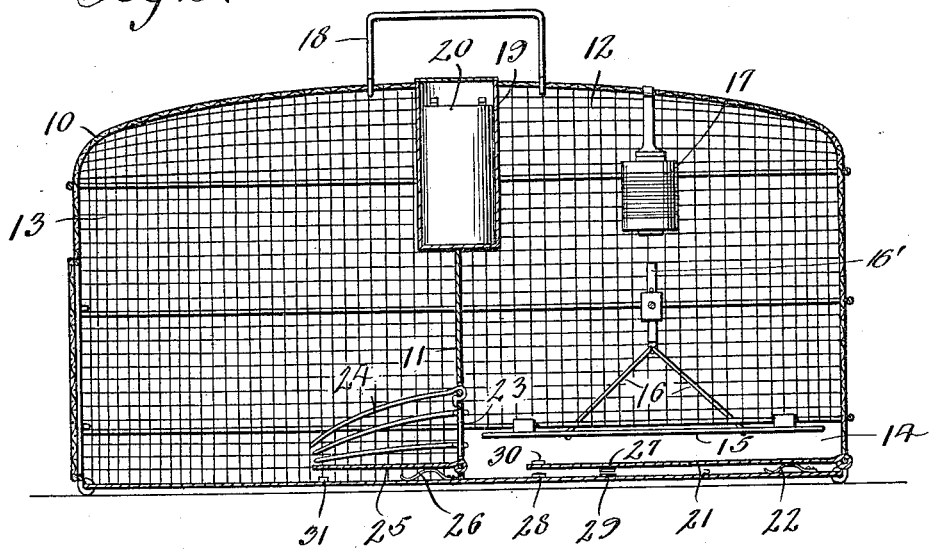
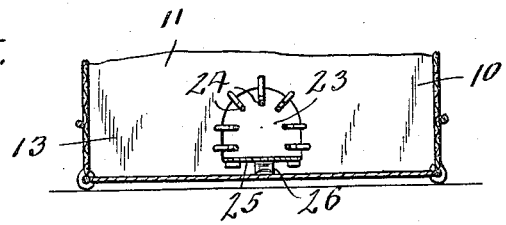
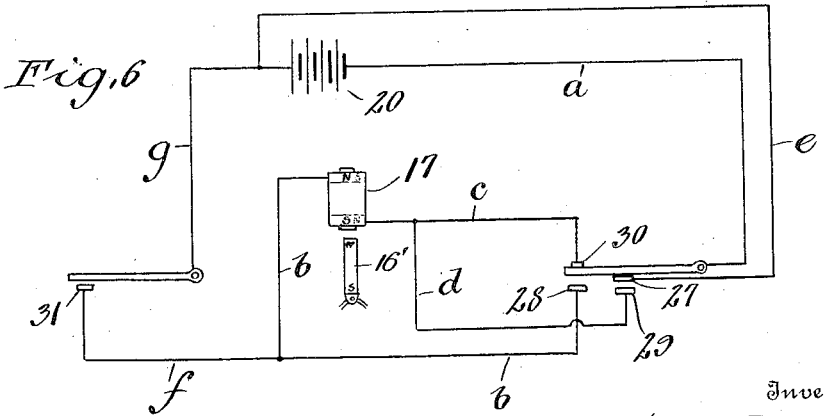

GREENE E. NEWELL, OF ELIASVILLE, TEXAS.

RAT-TRAP.

1,175,797.   Specification of Letters Patent.   Patented Mar. 14, 1916.

Application filed April 14, 1915. Serial No. 21,412.

*To all whom it may concern:*

Be it known that I, GREENE E. NEWELL, a citizen of the United States, residing at Eliasville, in the county of Young and State of Texas, have invented new and useful Improvements in Rat-Traps, of which the following is a specification.

An object of the invention is to provide a trap for use in catching rodents such as mice, rats and the like.

The invention contemplates, among other features, the provision of a trap which is electrically operated in that it provides entrances to a compartment of the trap and which entrances are electrically closed after the rodent has entered the compartment. The rodent now passes into the second compartment, which results in the electrical operation of the entrances of the first compartment to reopen the same, the rodent being confined and held in the second compartment and prevented from returning to the first compartment so that the first compartment is again ready, upon the opening of the entrances, to receive another victim.

In the further disclosure of the invention reference is to be had to the accompanying drawings, constituting a part of this specification, in which similar characters of reference denote corresponding parts in all the views, and in which:

Figure 1 is a side elevation of the trap; Fig. 2 is a front elevation; Fig. 3 is a vertical longitudinal sectional view; Fig. 4 is a vertical transverse sectional view taken on the line 4—4 in Fig. 1, the full lines indicating the open position of the closures and the dotted lines the closed position thereof; Fig. 5 is a vertical transverse sectional view taken on the line 5—5 in Fig. 1; and Fig. 6 is a diagrammatic view of the electrical connection.

Referring more particularly to the views, I provide a wire-like casing 10 divided by a transverse vertical partition 11 to form compartments 12 and 13. The compartment 12 is provided with a plurality of opposed openings 14 and mounted to swing on the wire-like casing 10 are a plurality of vertically movable closures 15 for the openings 14, suitable arms 16 having connection with the closures 15 and projecting upwardly toward each other to have their free ends connected with the armature 16' of an electromagnet 17, the armature being mounted in any suitable manner for vertical movement toward and away from the magnet 17 and permanently magnetized as clearly indicated in Fig. 6. The casing 10 is provided with a suitable handle 18 and a chamber 19 also forms a part of the casing to support an electric battery 20.

A platform 21 of some current conducting material is arranged in the bottom of the compartment 12 and is supported on springs 22, said platform having an edge thereof hinged to the casing in any suitable manner. The partition 11 is provided with an opening 23 providing access from the first compartment 12 to the second compartment 13 and a wire-like guard 24 is arranged upon the partition to encircle the opening 23, said guard permitting of passage from the compartment 12 to the compartment 13 but preventing passage from the compartment 13 back to the compartment 12.

The compartment 13 has a platform 25 arranged therein and supported on springs 26, said platform being somewhat similar to the platform 21 and also made of a current conducting material. To the under side of the platform 21 but insulated therefrom is a contact 27 and immediately beneath the platform 21 are contacts 28 and 29. There is also provided a rigid contact 30 immediately above the platform 21 and the platform 21 normally engages the contact 30, but when depressed is adapted to engage the contact 28, with the contact 27 on the under side of the platform but insulated therefrom adapted to engage the contact 29. Now referring to the diagrammatic view, it will be seen that a wire *a* passes from the battery 20 and connects with the platform 21; that a wire *b* connects with the contact 28 and with the electro-magnet 17; that a wire *c* connects with the electro-magnet 17 and with the contact 30 and also that a wire *d* connecting with the wire *c* has connection with the contact 29, still another wire *e* having connection with the contact 27 and returning to the battery 20 in the manner indicated. Now with regard to the platform 25, it will be seen that there is a wire *f* connecting with the wire *b* and terminating in a contact 31 adjacent the underside of the platform 25, a wire *g* connecting with the platform 25 and returning to the battery 20.

Now in the operation of the device described the closures 15 are normally open so that the rodent can pass through either of the openings 14 into the compartment 12. At the moment the weight of the rodent is received upon the platform 21 said platform will be depressed, thus causing the platform to engage the contact 28 and also causing the contact 27 to engage the contact 29. This closes an electrical circuit through the wire $a$ to the platform 21, through the wire $b$ to the electro-magnet 17 and through the wire $d$ to the engaging contacts 29 and 27 and thence through the wire $e$ back to the battery, the electro-magnet being thus energized to result in the operation of the arms 16, thereby swinging the closures 15 into closed position to prevent the escape of the rodent. The rodent, naturally looking for an avenue of escape, passes through the opening 23 in the partition 11, and in so doing, steps upon the platform 25 in the compartment 13. At the moment the rodent leaves the first compartment it will be apparent that the springs engaging the platform 21 will return the same to initial position, so that the platform will engage with the contact 30 and be out of engagement with the contact 28, the contact 27 being thus disengaged from the contact 29. Depression of the platform 25 causes the same to engage with the contact 31 and thus it will be seen that the electro-magnet will be energized in the opposite direction, thereby causing the same to release the arms 16 and permit the closures 15 to swing into an open position to receive the next victim, the current in the latter instance being adapted to pass from the battery 20 through the wire $a$ and platform 21 to the contact 30 and thence through the wire $c$ to the electro-magnet, through which it passes to operate the same, causing the release of the compartment, the current then passing through the wire $b$ and the wire $f$ to contact 30 which, engaged by the platform 25, results in current passing through the platform 25 and through the wire $g$ back to the battery, thus completing the circuit.

From the foregoing description it will therefore be seen that with a trap of the character described the entire operation will be electrically controlled in that the first compartment of the trap will be open to receive the first victim who, upon entering the compartment, will, due to his weight, result in the electrical operation of the electro-magnet, causing the closures to the first compartment to assume their closed positions. The rodent now passing into the second compartment and stepping upon the platform 25 again causes the electro-magnet to operate, resulting in the release of the closures from their closed position so that they can swing into open position to receive the next victim.

From the foregoing description it will be seen that the trap constructed as mentioned will present a neat and effective appearance and will effectually perform the result for which it is intended.

Having thus described my invention, I claim:

1. A trap comprising a casing, a partition formed to divide the casing into communicating compartments, doors controlling entrance passages into one of the compartments, a platform in each of said compartments, an electro-magnet, a source of electrical energy, and a circuit connection between said source of energy, magnet and one of said platforms through which the current flows in a given direction upon depression of the platform in said circuit, a circuit connection between said source of energy, magnet and other platform through which the current flows in an opposite direction around the magnet with respect to the first mentioned circuit when the latter mentioned platform is depressed, and means coöperating with said magnet to control the opening and closing movements of said doors.

2. A trap comprising a casing, a partition formed to divide the casing into communicating compartments, doors controlling entrance passages into one of the compartments, a platform in each of said compartments, an electro-magnet, a source of electrical energy, and a circuit connection between said source of energy, magnet and one of said platforms through which the current flows in a given direction upon depression of said platform, a circuit connection between said source of energy, magnet and other platform through which the current flows in an opposite direction around the magnet with respect to the first mentioned circuit when the latter mentioned platform is depressed, means coöperating with said magnet to control the opening and closing movements of said doors, and means for normally holding said platforms out of electrical communication with their respective circuits.

3. A trap comprising a casing, a partition formed to divide the casing into communicating compartments, doors controlling entrance passages into one of the compartments, a platform in each of said compartments, a source of electrical energy, an electro-magnet, and a circuit connection between said source of energy, magnet and one of said platforms through which the current flows in a given direction upon depression of said platform, a circuit connection between said source of energy, magnet and other platform through which the current flows in an opposite direction around the magnet with respect to the above mentioned circuit upon depression of the latter mentioned platform, and arms projecting from said doors to coöperate with said magnet to control the opening and closing movements of said doors simultaneously as described.

4. A trap comprising a casing, a partition formed to divide the casing into communicating compartments, doors controlling entrance passages into one of the compartments, a source of electrical energy and a circuit connection between said source of energy, magnet and one of said platforms through which the current flows in a given direction upon depression of said platform, a circuit connection between said source of energy, magnet and other platform through which the current flows in an opposite direction around the magnet with respect to the above mentioned circuit upon depression of the latter mentioned platform, arms projecting from said doors to coöperate with said magnet to control the opening and closing movements of said doors simultaneously as described, and springs normally holding the said platforms out of electrical communication with their respective circuits.

In testimony whereof I affix my signature in presence of two witnesses.

GREENE E. NEWELL.

Witnesses:
W. G. McGlouvry,
C. C. Ardis.

Copies of this patent may be obtained for five cents each, by addressing the "Commissioner of Patents, Washington, D. C."